United States Patent
Turner et al.

(10) Patent No.: US 7,345,444 B2
(45) Date of Patent: Mar. 18, 2008

(54) INTERMITTENT WASHER

(75) Inventors: Phillip M Turner, Grand Blanc, MI (US); Yueh-Se J Huang, Ann Arbor, MI (US); Pei-Chung Wang, Troy, MI (US)

(73) Assignee: General Motors Corporation, Detroit, MI (US)

( * ) Notice: Subject to any disclaimer, the term of this patent is extended or adjusted under 35 U.S.C. 154(b) by 827 days.

(21) Appl. No.: 10/684,924

(22) Filed: Oct. 14, 2003

(65) Prior Publication Data

US 2005/0076462 A1    Apr. 14, 2005

(51) Int. Cl.
*H02P 1/04*   (2006.01)
*H02P 5/00*   (2006.01)
*H02P 7/00*   (2006.01)

(52) U.S. Cl. .................. 318/443; 318/444; 318/445
(58) Field of Classification Search ............ None
See application file for complete search history.

(56) References Cited

U.S. PATENT DOCUMENTS

| | | | |
|---|---|---|---|
| 3,783,700 A * | 1/1974 | Kuck | 74/55 |
| 4,275,477 A * | 6/1981 | Kato | 15/250.02 |
| 4,339,698 A | 7/1982 | Kearns | |
| 4,544,870 A | 10/1985 | Kearns et al. | |
| 4,731,566 A | 3/1988 | Takaishi | |
| 4,851,745 A | 7/1989 | Ponziani | |
| 5,245,259 A * | 9/1993 | Nakamura et al. | 318/443 |
| 5,734,243 A | 3/1998 | Pabla et al. | |
| 2003/0042328 A1* | 3/2003 | Wojan et al. | 239/284.1 |

FOREIGN PATENT DOCUMENTS

| | | |
|---|---|---|
| DE | 3123729 | 4/1982 |
| EP | 0 448 487 | 9/1991 |
| EP | 0448487 | 9/1991 |
| EP | 0850811 | 7/1998 |
| GB | 2 335 592 | 9/1999 |
| GB | 2335592 | 9/1999 |

* cited by examiner

*Primary Examiner*—Lincoln Donovan
*Assistant Examiner*—Erick Glass

(57) ABSTRACT

A window washer control system and method administers fluid intermittently to a window based on an intermittent setting. A washer switch includes a plurality of frequency settings for varying a time interval between fluid administering events. The fluid level in a washer fluid reservoir is monitored to ensure a predetermined level. If the fluid level is below a predetermined level, control prevents intermittent washer administration and allows only manual activation.

14 Claims, 3 Drawing Sheets

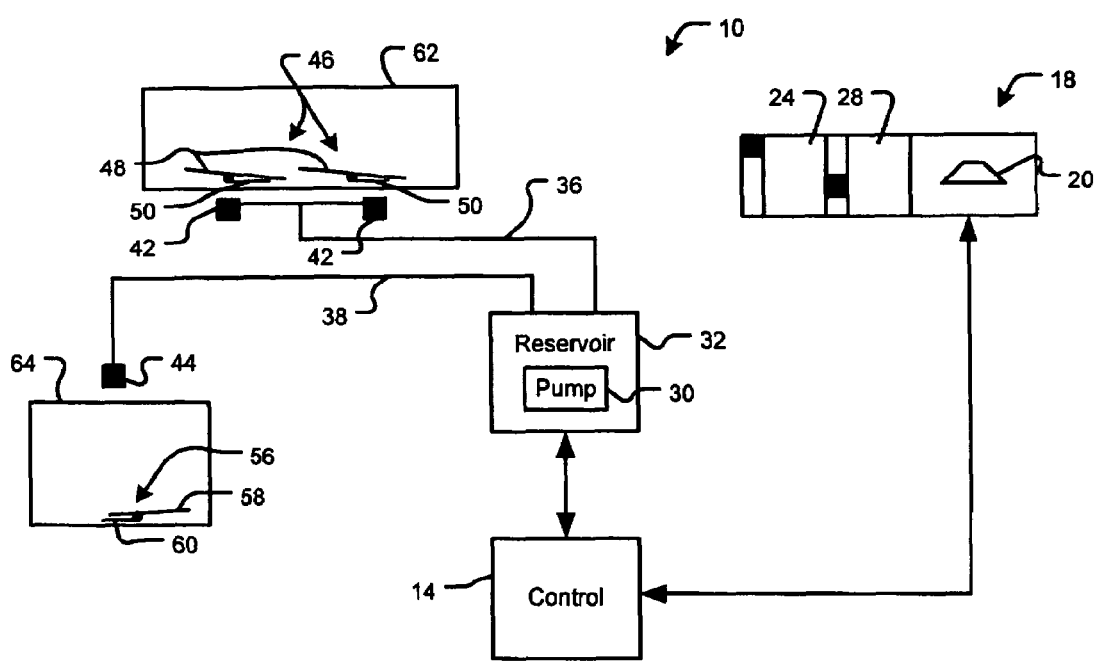
FIG. 1
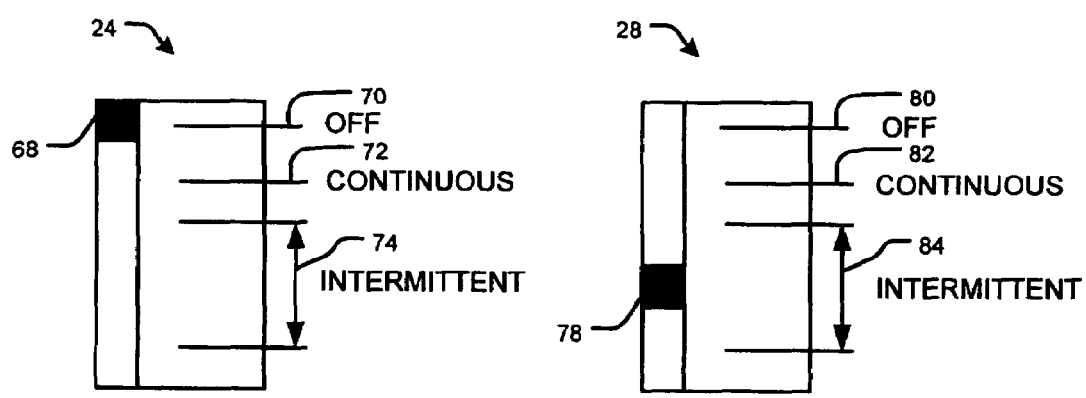
FIG. 2           FIG. 3

INTERMITTENT WASHER

FIELD OF THE INVENTION

The present invention relates to washer systems for windows, and more particularly to a washer system having an intermittent fluid delivery feature.

BACKGROUND OF THE INVENTION

Automobile windows are exemplary of windows equipped with wiper systems for clearing a window, windshield and/or a rear window from rain, snow or other debris. Some wiper systems include an intermittent feature that allows the user to incorporate a time delay between wiper swipe events. Such a feature is convenient when swipe events are desired on a less than continuous basis. On some systems such as in vehicles, the time delay may be varied by the user according to driving conditions. For example, a long time delay may be desired for driving in light rain or snow. Similarly, a short time delay may be appropriate for driving in heavier precipitation.

Typically, a wiper system includes a wash feature for administering wiper fluid onto the window in conjunction with a wiper swipe event. The wash feature is generally activated as a one time event upon operator request. As a result, an operator must observe the condition of the windshield or window on a continuous basis and initiate a wash event as needed. Often, while driving in unfavorable environmental conditions a wash event is needed on a regular basis. This condition is particularly apparent on the rear window of vans, sport utility vehicles and other vehicles having a generally upright rear window. Manual actuation of the wash feature in this situation is inconvenient.

SUMMARY OF THE INVENTION

A washer control system and method delivers fluid intermittently. An intermittent operational mode is selected having a corresponding frequency of fluid delivery. Fluid is administered intermittently to the window based on the intermittent operational mode.

In other features, the control system determines if a fluid level of a fluid reservoir is below a predetermined level. If the level is below the predetermined level, fluid administration is discontinued while in the intermittent setting.

A method for administering fluid to a window determines an operating mode selected by the user from a range of operating modes. Fluid is administered to the window. A predetermined time is observed corresponding to the selected operating mode. Fluid is readministered to the window.

In other features, intermittent fluid delivery is overridden based upon a request. A request may include instant fluid delivery or a delay in intermittent fluid delivery.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a functional block diagram of a wiper control system according to the present invention;

FIG. 2 is a representation of an exemplary wiper control switch according to the present invention;

FIG. 3 is a representation of an exemplary washer control switch according to the present invention;

DETAILED DESCRIPTION OF THE PREFERRED EMBODIMENTS

Figure 4:
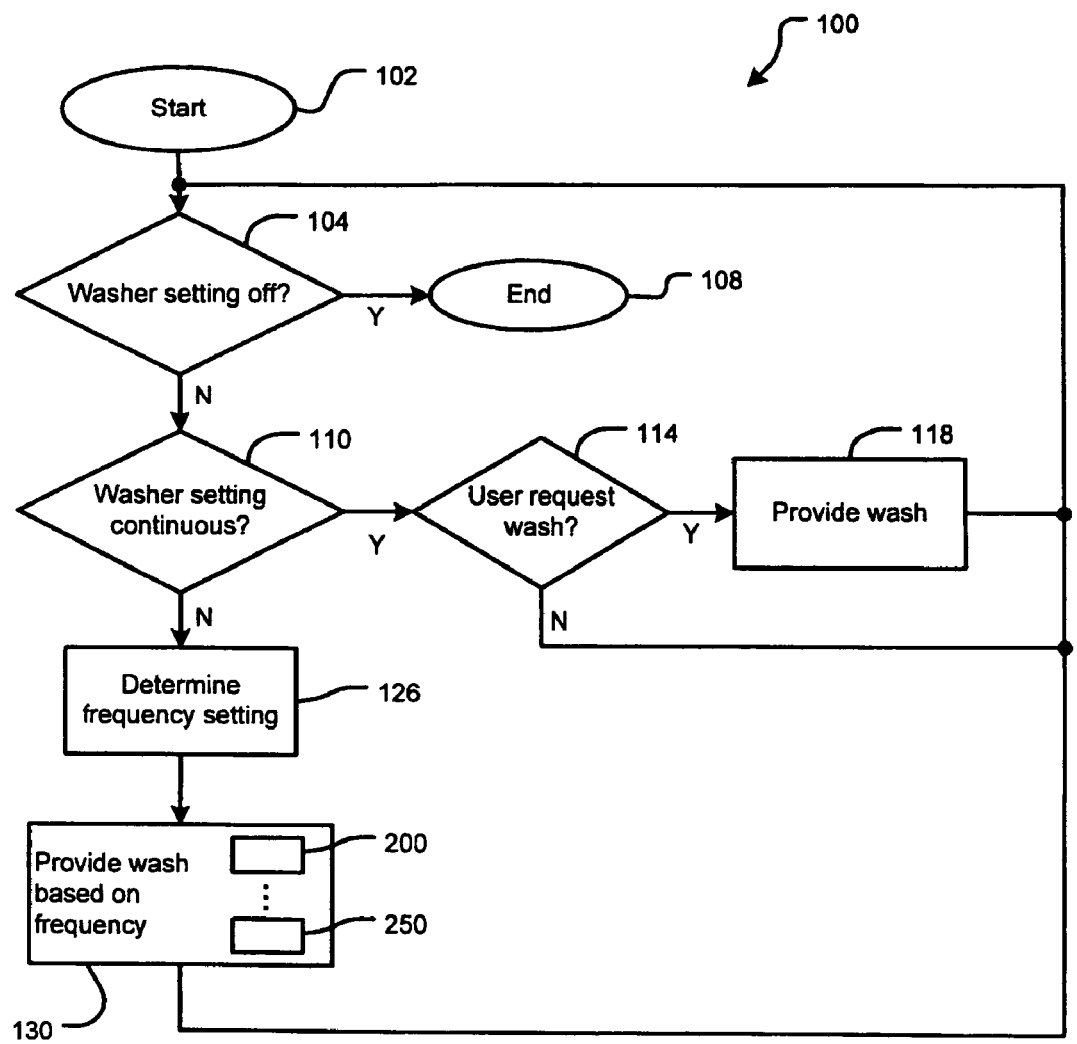
FIG. 4 is a flow diagram illustrating steps for controlling the intermittent washer.

The following description of the preferred embodiment is merely exemplary in nature and is in no way intended to limit the invention, its application, or uses. For purposes of clarity, the same reference numbers will be used in the drawings to identify similar elements Referring to FIG. 1, a window wiper control system 10 according to the present invention includes a wiper control module 14 and control stem 18. The control stem 18 generally includes a manual wash control tab 20, a wiper control switch 24 and a washer control switch 28 incorporated thereon. The wiper control switch 24 and the washer control switch 28 may comprise any type of switch suitable to communicate a range of inputs such as but not limited to a rheostat-type switch for example. The wiper control module 14 communicates with a fluid pump 30 disposed in a fluid reservoir 32 containing washer fluid. The pump 30 delivers washer fluid from the fluid reservoir 32 through fluid lines 36, 38 to respective front and rear spray nozzles 42, 44. A front wiper assembly 46 includes wipers 48 pivotally coupled to wiper arms 50. A rear wiper assembly 56 includes a wiper 58 pivotally coupled to a wiper arm 60.

The front spray nozzles 42 are located proximate to a front windshield 62 and may be mounted on a vehicle hood (not shown) or alternatively on the wipers 48 or wiper arms 50 of the front wiper assembly 46 for example. Similarly, the rear spray nozzle 44 is located proximate to a rear window 64 and may be mounted on a rear door (not shown) or alternatively on the wiper 58 or wiper arm 60 of the rear wiper assembly 56 for example. The front and rear spray nozzles 42, 44 are oriented to dispense washer fluid over a substantial viewing area of the respective front windshield 62 and rear window 64.

Turning now to FIGS. 2 and 3, the wiper control switch 24 and the washer control switch 28 will be described in greater detail. The wiper control switch 24 generally includes a moveable selector 68 for aligning with a desired operating condition. In general, the selector 68 is moveable to an off position 70, a continuous position 72 and a range of intermittent positions 74. The intermittent range 74 corresponds to intermittent wiping conditions having a range of selectable time delays.

The washer control switch 28 generally includes a moveable selector 78 for aligning with a desired operating condition. In general, the selector 78 is moveable to an off position 80, a continuous position 82 and a range of intermittent positions 84. The intermittent range 84 corresponds to intermittent washing conditions having a range of selectable time delays. Skilled artisans will readily appreciate that alternative control switches may be employed for the wiper and/or washer control for communicating a desired condition to the wiper control module 14.

The wiper control system 10 of the present invention allows an operator to select a desired time interval or frequency for fluid delivery. In this way, movement of the selector 78 along the intermittent range 84 modifies a time delay between fluid administering events. The available time delays may range from every 30 seconds to every 20 minutes for example. It is appreciated that other time delays may similarly employed in relation to the intermittent range 84.

While operating in an intermittent wash condition, the control system 10 will also allow manual fluid delivery on demand through actuation of the manual wash control tab 20. In this way, an operator desiring an immediate fluid delivery while in an intermittent setting may override the time delay associated with the intermittent setting. Furthermore, the control system 10 will also delay fluid delivery while in the intermittent setting based on a user input or other input such as an environmental condition.

While operating in an intermittent wash setting, the control system 10 ensures the fluid level in the fluid reservoir 32 does not drop below a predetermined setting. Preferably, between wash events and during the time delay control verifies that the fluid level remains sufficient to provide fluid on a needed basis until the reservoir 32 may be replenished by the operator. The predetermined level may be set to 20 percent of full reservoir capacity for example. If the level drops below the predetermined setting, control activates a telltale on the instrument cluster (not shown) identifying low washer fluid level. When the telltale is actuated, fluid will not be administered while in an intermittent setting and can only be delivered manually through wash control tab 20.

Figure 5:
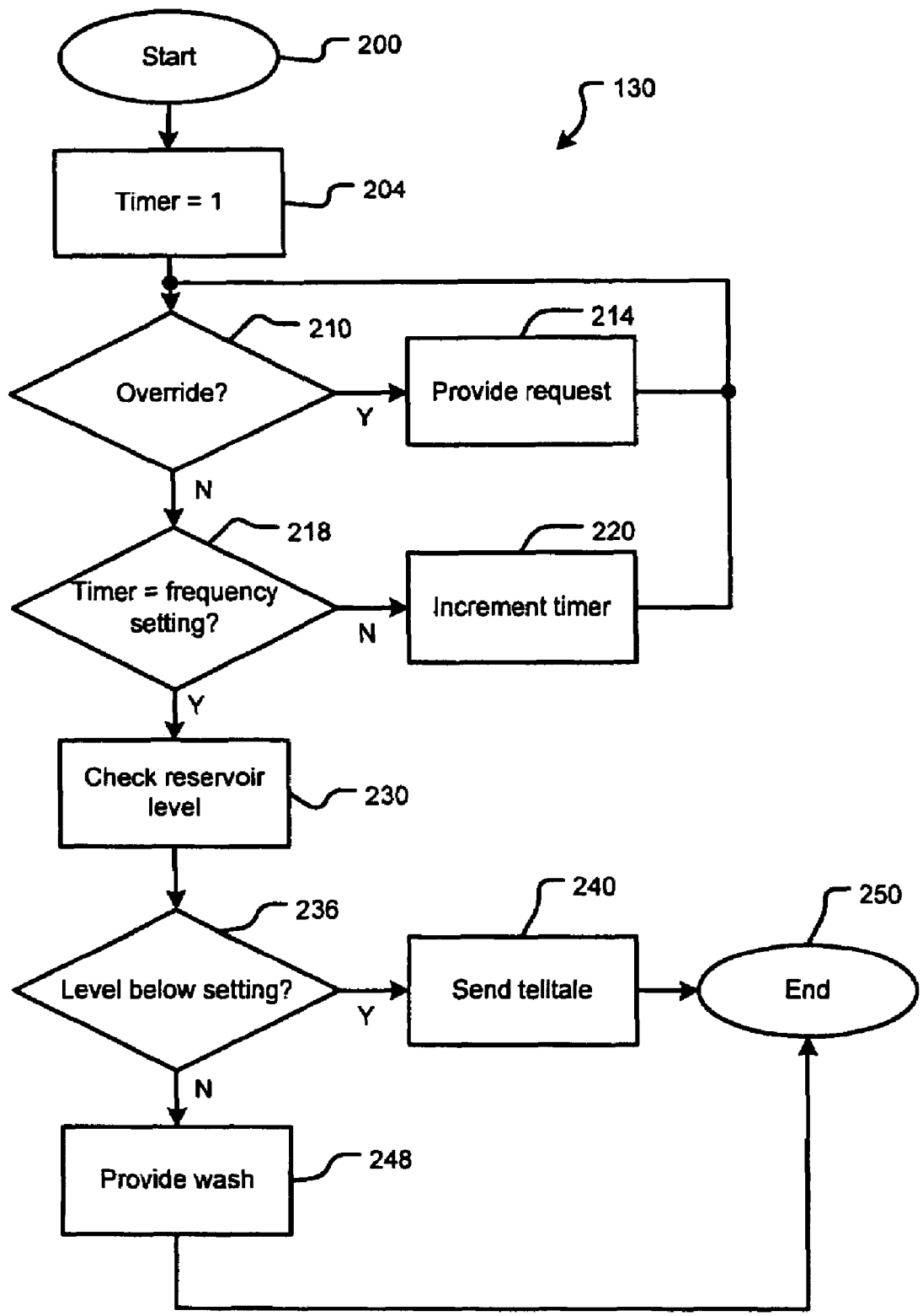
FIG. 5 is a flow diagram illustrating steps for providing a wash based on a frequency setting.

Turning now to FIGS. 4 and 5, steps for operating a window wiper control system according to the present invention are shown generally at 100. For simplicity, operation of the control system will be described as it relates to operation with the rear window 64. It is appreciated however that the intermittent washing feature may be similarly employed for use with the front windshield 62. Control begins with step 102. In step 104, control determines whether the washer switch 28 is set to the off position 80. If yes, control ends in step 108. If control is not set to the off position 80, control determines if the washer switch 28 is set to the continuous position 82 in step 110. If yes, control determines if a user requests a wash in step 114. If yes, control commands fluid delivery in step 118. If a user does not request a wash, control loops to step 104. If control determines that the washer switch 28 is not set to the continuous position 82 in step 110, a frequency setting is determined in step 126. An intermittent wash is provided in step 130, as will be described in greater detail, and control loops to step 104.

With particular reference now to FIG. 5, intermittent wash control 130 will be described. Control begins with step 200. In step 204, a timer is set to 1. In step 210 control determines if an override has been requested. If yes, control commands instant fluid delivery or delays fluid delivery based on the override in step 214 and control loops to step 210. If an override is not requested in step 210, control determines if the timer equals a frequency setting selected from the intermittent range 84 on the washer control switch 28 in step 218. If not, the timer is incremented in step 220 and control loops to step 210. If the timer equals the frequency setting, fluid level is determined in the fluid reservoir 32 in step 230. In step 236, control determines if the reservoir level is below a predetermined setting. If the fluid level is below a predetermined level, a telltale is signaled in step 240 and control ends in step 250. If fluid level is not below a predetermined setting, control commands fluid delivery in step 248 and control ends at 250.

Those skilled in the art can now appreciate from the foregoing description that the broad teachings of the present invention can be implemented in a variety of forms. For example, the continuous setting 82 available on the washer control switch 28 may be eliminated. In addition, the intermittent feature available with respect to the washer control switch 28 may alternatively be incorporated on an in-dash switch for example exclusively assigned to a predetermined window. The in-dash switch may also incorporate a manual wash button similar to that described with respect to the manual wash control tab 20. It is envisioned that an in-dash washer switch may be used in conjunction with the washer switch 28 on the control stem 18 such that each switch may be assigned exclusively to one of respective windows 62, 64. Therefore, while this invention has been described in connection with particular examples thereof, the true scope of the invention should not be so limited since other modifications will become apparent to the skilled practitioner upon a study of the drawings, the specification and the following claims.

What is claimed is:

1. A windshield washer apparatus of the type comprising a fluid delivery device to deliver a cleaning fluid to the windshield, comprising:
    a washer switch having a variable frequency setting;
    a controller that communicates with said washer switch and said fluid delivery device and that controls operation of said fluid delivery device for delivering fluids intermittently; and
    a manual override for postponing fluid delivery while in said variable frequency setting.

2. The apparatus of claim 1 wherein said fluid delivery is selectively adjustable among a range of intermittent settings.

3. The apparatus of claim 2 wherein said intermittent settings correspond to predetermined time delays between successive fluid delivery events.

4. The apparatus of claim 1 wherein said apparatus further includes a manual override for delivering fluid on demand while in said variable frequency setting.

5. The apparatus of claim 1, further including a fluid dispensing device for receiving fluid from said fluid delivery device and which dispenses fluid onto a window.

6. A method for administering fluid to a window comprising:
    selecting an intermittent operational mode having a corresponding frequency of fluid delivery;
    administering fluid intermittently to the window based on said intermittent operational mode;
    determining if fluid level of a fluid reservoir is below a predetermined level and providing a signal if said fluid level is below said predetermined level; and
    discontinuing fluid administration if said fluid level is below said predetermined level while in said intermittent operational mode.

7. The method of claim 6 wherein providing a signal includes providing a warning signal.

8. The method of claim 6 wherein providing a signal includes terminating fluid delivery.

9. The method of claim 6, further comprising delivering fluid on demand while in said variable frequency setting based on a requested override.

10. The method of claim 6, further comprising postponing fluid delivery while in said variable frequency mode based on a requested override.

11. A method for administering fluid to a window based on a user selected setting comprising:

determining an operating mode selected by the user from a range of operating modes;
administering fluid to the window;
waiting a predetermined time corresponding to said selected operating mode;
readministering fluid to the window; and
discontinuing fluid administration if fluid level of a fluid reservoir is below a predetermined level while in said intermittent setting.

12. The method of claim 11, further comprising overriding said administering based on a request.

13. The method of claim 12 wherein overriding includes administering fluid instantly based on said request.

14. The method of claim 12 wherein overriding includes postponing fluid administration.

* * * * *